US Patent [19]  
Montierth

[11] 4,416,676  
[45] Nov. 22, 1983

[54] HONEYCOMB FILTER AND METHOD OF MAKING IT

[75] Inventor: Max R. Montierth, Elmira, N.Y.

[73] Assignee: Corning Glass Works, Corning, N.Y.

[21] Appl. No.: 350,994

[22] Filed: Feb. 22, 1982

[51] Int. Cl.³ .......................................... B01D 39/20
[52] U.S. Cl. .............................. 55/523; 55/DIG. 5; 55/DIG. 30; 210/510.1; 422/180; 60/311; 29/163.5 F
[58] Field of Search .......... 55/484, 502, 523, DIG. 5, 55/DIG. 30; 210/510; 422/171, 180; 428/116-118; 60/295, 299, 311; 165/8; 252/477 R; 501/112, 119, 80; 29/163.5 F

[56] References Cited

U.S. PATENT DOCUMENTS

| | | | |
|---|---|---|---|
| 3,983,283 | 9/1976 | Bagley | 422/180 |
| 4,127,691 | 11/1978 | Frost | 428/116 |
| 4,135,018 | 1/1979 | Bonin et al. | 428/116 |
| 4,177,307 | 12/1979 | Torii et al. | 428/116 |
| 4,233,351 | 11/1980 | Okumura et al. | 428/116 |
| 4,276,071 | 6/1981 | Outland | 55/523 |
| 4,323,614 | 4/1982 | Golati | 428/116 |
| 4,329,162 | 5/1982 | Pitcher, Jr. | 55/523 |
| 4,333,518 | 6/1982 | Frost et al. | 165/8 |
| 4,335,783 | 6/1982 | McBrayer et al. | 165/8 |

FOREIGN PATENT DOCUMENTS 2022071 12/1979 United Kingdom .................. 165/8

Primary Examiner—David L. Lacey  
Attorney, Agent, or Firm—R. N. Wardell

[57] ABSTRACT

In a solid particulate filter of honeycomb structure comprising a matrix of thin, interconnecting porous walls defining groups of inlet and outlet cells, the characteristics of fluid flow through a first subset of the thin walls, being shared in common between adjoining inlet and outlet cells, are differentially controlled relative to that of a second subset of thin walls, being shared in common between adjoining inlet cells, by forming each subset with uniform thicknesses which differ between the subsets. In a brittle solid particulate filter of honycomb structure having opposing inlet and outlet end faces and cells extending therebetween, improved thermal shock capability is provided by selecting outlet cell geometries and orientations with respect to the inlet cells so as to form flexing or movable joints between some or all of the thin walls shared by adjoining inlet and outlet cells and the thin walls shared between adjoining inlet cells.

23 Claims, 8 Drawing Figures

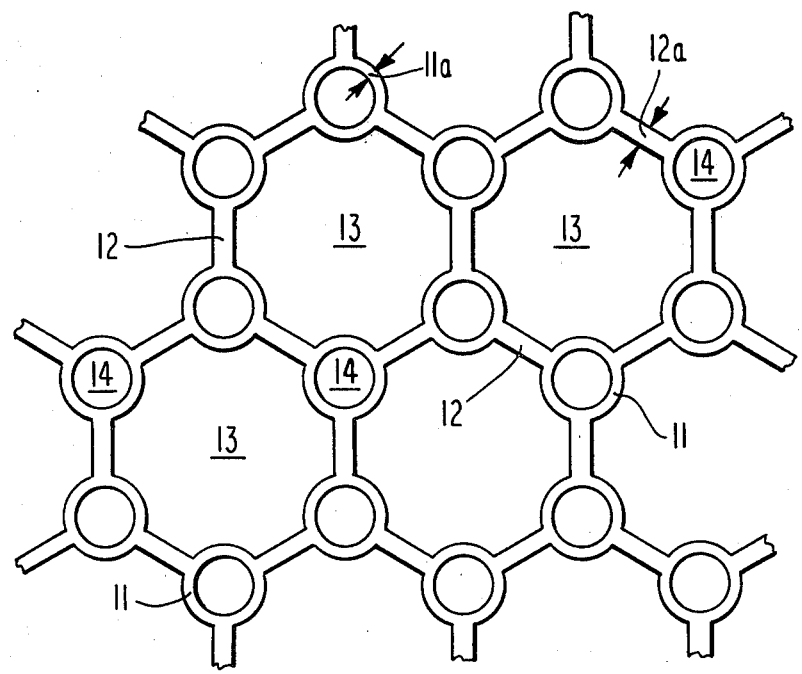
_Fig. 4_
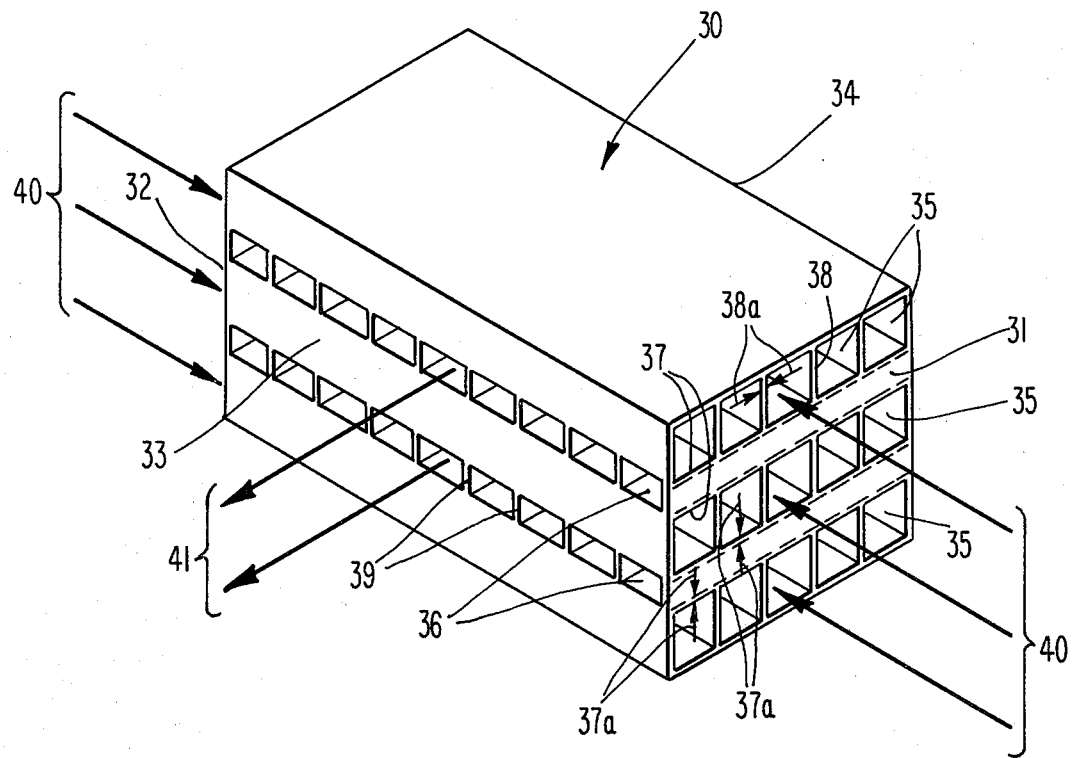
_Fig. 5_

HONEYCOMB FILTER AND METHOD OF MAKING IT

BACKGROUND OF THE INVENTION

The invention relates to filters for trapping solid particulates present in fluids and, in particular, to filter bodies formed from thin porous walled, honeycomb structures.

The removal of solid particulates from fluids, gases or liquids, in which the particulates are mixed or suspended is typically accomplished by means of filters made from solid materials which are formed into articles or masses having a plurality of pores of small cross-sectional size extending therethrough, which may be interconnected, such that the solid materials are both permeable to the fluids which flow through the article or mass and capable of restraining some or all of the particulates mixed in the fluid from passing through the article or mass, as desired. Such pores constitute what is termed "open porosity" or "accessible porosity". The restrained particulates are collected on the inlet surface(s) and/or within the pores of the material. The minimum cross-sectional size of some or all of the pores can be larger than the size of some or all of the particulates to be removed from the fluid, but only to the extent that significant or desired amounts of sufficiently large particulates become trapped on or within the filters during the transit of contaminated fluid. As the mass of collected particulates increases, the flow rate of the fluid through the filter generally decreases to an undesirable level. The filter is then either discarded as a disposal, replaceable element or regenerated by suitably removing the collected particulates so that it may be reused.

Certain considerations are helpful in evaluating and comparing filters. One is filter efficiency, that is, the amount of the suspended particulates of concern that are removed from the fluid as it passes through the filter (hereinafter expressed as a percentage of the weight of all particulates in the fluid prior to its passing through the filter). Required or desired efficiencies will vary for different filtering applications and typically will range from a substantial portion to all or substantially all of the particulates passed through the filter. Another consideration is flow rate, that is the volume of fluid per unit of time that passes through the filter and collected particulates. In a closed, continuous feed system, a consideration related to flow rate is the pressure drop across the filter, i.e. the difference between the fluid pressure upstream and downstream from the filter caused by the presence of the filter and particulates thereon which is dependent upon and increases with flow rate. Yet another consideration is operating time, the cumulative time of service of a filter before its flow rate or pressure drop becomes unacceptable so as to necessitate replacement and/or regeneration of the filter. Yet another consideration is particulate capacity, the amount of particulates material that the filter can hold while still providing a minimum acceptable flow rate or maximum acceptable pressure drop. Other desirable features of the filter include compact structure, mechanical integrity, thermal shock resistance durability, inertness or non-deleterious reaction with the fluid and/or particulate material.

It has been known for some time that honeycomb structures having a plurality of hollow passages or cells extending through them, which are formed in whole or in part by thin porous interconnected walls, may be successfully employed in filtering applications. U.S. Pat. Nos. 4,060,488, and 4,069,157 describe fluid filtering apparatus constructed by applying to a porous support body such as a thin porous walled honeycomb structure, a suitable filtering membrane. The membrane allows a separable component of a fluid solution or mixture transversing the honeycomb structure passages supporting the membrane to pass into the porous support structure. The filtrate fluid migrates through the open porosity of the support structure to an internal reservoir or to an outer surface of the structure where it is removed.

U.S. Pat. Nos. 4,041,591 and 4,041,592, assigned to the assignee hereof, describe multiple flow path bodies and methods for fabricating the same from honeycomb structures having columns or layers of hollow cells which extend in a substantially mutually parallel fashion through the structure and which are formed by a plurality of thin intersecting walls. The structure is modified so that two separate fluids may be transported through alternate columns or layers of cells. It is suggested that the described multiflow path body might optionally be used in filtration and osmotic separation applications by using porous materials to produce the original honeycomb structure. As described, the device would function like those of the aforesaid U.S. Pat. Nos. 4,060,488, and 4,069,157 which allow only a fraction of a fluid which is passed through the alternate columns or layers of cells to migrate across the thin porous walls into the adjoining interleaved columns or layers of cells while the remainder of the fluid, having a higher concentration of contaminant or separable constituent, continues to pass through and exits the structure.

Porous walled honeycomb structures may also be used directly (i.e. without a filter membrane or other covering) to filter all fluid passed through the structure. Application Ser. No. 165,646, filed July 3, 1980 and assigned to the assignee hereof, and U.S. Pat. No. 4,276,071 both describe filters formed from honeycomb structures, themselves formed by matrices of thin, porous, intersecting walls which define a pair of open, opposing end faces and a multiplicity of hollow, substantially mutually parallel passages or cells extending longitudinally through the structure between the end faces. At each end face where the open transverse areas of the cells would normally be exposed, the ends of alternate cells are closed in a checkered or checkerboard pattern such as is depicted in an exemplary fashion in FIG. 2. The pattern is reversed at either end face so that each cell of the structure is closed at only one end face and shares thin walls in common with adjoining cells which are blocked only at the opposing end face of the structure. A contaminated fluid is introduced under pressure to a "inlet" end face of the filter body and passes into those cells open at the inlet end face ("inlet" cells). Because the inlet cells are closed at the opposing, "outlet" end face of the structure, the contaminated fluid is forced to pass across the narrow dimension of the thin, porous walls into the adjoining "outlet" cells (which are all closed at the inlet end face and open at the outlet end face of the structure) and through them from the outlet end face of the filter. All or substantially all of the solid particulate matter is deposited on the thin wall surfaces defining the interior of the inlet cells or is trapped in the pores forming the open porosity of the thin walls. All of the contaminated fluid passing through the structure is filtered and all of the interconnected, thin walls of the structure, each of which is shared in common between an adjoining inlet and outlet cell, are utilized in filtering.

U.S. Pat. No. 4,276,071 also describes a second filter embodiment formed from a crossflow honeycomb structure in which layers of longitudinally extending and laterally extending passages are alternately stacked. Fluid containing solid particulate contaminant is passed into either end of one of the two commonly extending sets of passages and is recovered after filtering from the remaining set of interleaved, commonly extending passages. As only the thin walls separating the laterally and longitudinally extending layers of cells are porous, filtration occurs only through those thin walls which are shared in common between adjoining inlet and outlet passages. Accordingly, this device is only about one-half as efficient as a comparably sized and dimensioned honeycomb structure incorporating the previously described checkered pattern of alternate cells.

As is described and claimed in a copending application Ser. No. 350,998 entitled FILTER APPARATUS, filed on the same date as this application and assigned to the assignee hereof, by providing a filter of honeycomb structure formed by a matrix of interconnected thin walls having at least a minimum requisite amount of interconnected open porosity, filtration can be achieved through all thin walls defining each inlet cell irrespective of the type of adjoining cell (i.e. inlet or outlet) with which the inlet cell shares its defining thin walls.

According to yet another copending application Ser. No. 350,995 also filed on the same date of this application and assigned to the assignee hereof, improved particulate capacity and operating time, albeit at the expense of initially increased pressure drop, typically can be achieved in a honeycomb filter of given total thin wall surface area by providing significantly more collective inlet cell than collective outlet cell thin wall surface area. Again, interconnected thin walls forming the cells of the filter are provided with sufficient interconnected open porosity to allow the fluid to flow completely through and across any of their dimensions in any direction and to prevent at least a significant portion of the solid particulate contaminant from flowing either completely through or completely across the walls in any direction.

SUMMARY OF THE INVENTION

According to one aspect of the invention, in those honeycomb filters having at least two subsets of interconnected thin walls, a first subset being shared in common between an outlet cell and adjoining inlet cells adjoining the outlet cell, and each wall of the second subset being shared in common between adjoining inlet cells, flows of fluid across the thickness of the first subset of thin walls and through the longer dimensions of the second subset thin walls are differentially controlled by varying the characteristics of these two subsets of thin walls.

In particular, a honeycomb filter for removing solid particulates from fluids is provided comprising a multiplicity of interconnected thin walls defining at least one inlet end face and one outlet end face on different outer surfaces of the filter and a multiplicity of cells each extending through the filter from at least one of the inlet or outlet end faces, an inlet group of the cells being open only at one or more of the inlet end faces and an outlet group of the cells being open only at one or more of the outlet end faces of the filter. Each of the thin walls of a first subset of the walls has a first uniform thickness and is shared in common between an outlet cell and one or more of the inlet cells adjoining the outlet cells. The first subset of thin walls have interconnected open porosity of a volume and size sufficient to enable the fluid to flow completely across their thickness between the adjoining inlet and outlet cells and to prevent at least a significant portion of the solid particulate matter from passing either completely thereacross or therethrough. Each of the thin walls of a second subset of the walls has a second uniform thickness and is shared in common between a pair of adjoining inlet cells. The second subset thin walls have interconnected open porosity of a volume and size sufficient to enable the fluid to flow completely therethrough in their longer dimensions and to prevent at least a significant portion of the solid particulate matter from passing either completely across or through the second subset of thin walls in any direction. According to the invention, the first and second uniform thicknesses are differed from one another to differentially control fluid flow rates through the two subsets of thin walls.

According to one feature of the invention, the first uniform thickness of the first subset of thin walls is less than the second uniform thickness of the second subset of thin walls so as to maximize fluid flow rates per unit surface area across each of the two subsets of thin walls.

According to another feature of the invention, the first uniform thickness of the first subset of thin walls is greater than the second uniform thickness of the second subset of the thin walls to achieve substantially uniform fluid flow rates through equal surface areas of the first and second subsets of thin walls.

According to an important feature of the invention, the open porosity of the second subset of thin walls is greater than 25% by volume and preferably at least 35% or more by volume to provide sufficient interstitial pore volume for fluid flow through the longer dimensions of those thin walls.

According to yet another important feature of the invention, the greater of the first and second uniform thicknesses is at least 0.003 inches thicker (about 0.076 mm.) than the remaining uniform thickness.

According to yet another important feature of the invention, the greater thickness of the first and second uniform thicknesses is also at least 20% thicker than the remaining uniform thickness.

According to yet another important feature of the invention, the thin walls are preferably formed from a ceramic based material and are particularly useful in applications such as diesel particulate exhaust gas filtering.

According to yet another feature of the invention, the open porosity of the diesel particulate filters are formed by pores having mean diameters of about 1 and 60 microns.

For at least a subset of the previously described filters, those used with hot fluids and having opposing inlet and outlet end faces wherein the multiplicity of inlet and outlet cells extend between these two end faces, I have found that thermal shock problems can be diminished by selecting cell size, shape and arrangement such that no group of the thin walls intersects to form a substantially continuous plane extending substantially or entirely across the inlet or outlet to the resulting filter. Accordingly, another aspect of my invention is filters of honeycomb structure each comprising a matrix of brittle thin porous interconnected walls defining an inlet end face and an outlet end face on opposing sides of the filter and a multiplicity of cells extending through the filter between the inlet and outlet end faces. Each thin wall of a second subset of the thin walls is shared in common between adjoining inlet cells. Each thin wall of a first subset of the thin walls is shared in common between an outlet cell and inlet cells adjoining the outlet cell. Each thin wall of the first subset is interconnected preferably in a substantially perpendicular manner with a thin wall of the second subset so as to form a flexing, thin wall joint therebetween.

The invention also includes the methods of differentially controlling flow rates through the thin walls of honeycomb filters by varying uniform thicknesses between subsets of thin walls and of reducing thermal gradient problems by forming flexing joints at thin wall intersections.

DESCRIPTION OF THE DRAWINGS

FIG. 1c is a view similar to FIG. 1b of an alternate exemplary embodiment of the filter of FIGS. 1 and 1a.

FIGS. 2 through 4 depict in expanded transverse cross-sectional views similar to those of FIGS. 1b and 1c other exemplary preferred embodiments of the invention illustrating some of the various cellular geometries and arrangements which may be used; and FIG. 5 depicts an alternate exemplary cross-flow filter embodiment according to one aspect of the invention.

DETAILED DESCRIPTION OF THE INVENTION

A significant aspect of this invention is the control of fluid flow rates through a filter of honeycomb structure by varying the character of interconnected thin walls forming the filter and its cell and, in particular, by varying the thickness of the thin walls so as to achieve desired fluid flow rates therethrough. This aspect of the invention will now be explained in greater detail with respect to the accompanying FIGS. 1 through 5.

Figure 1:
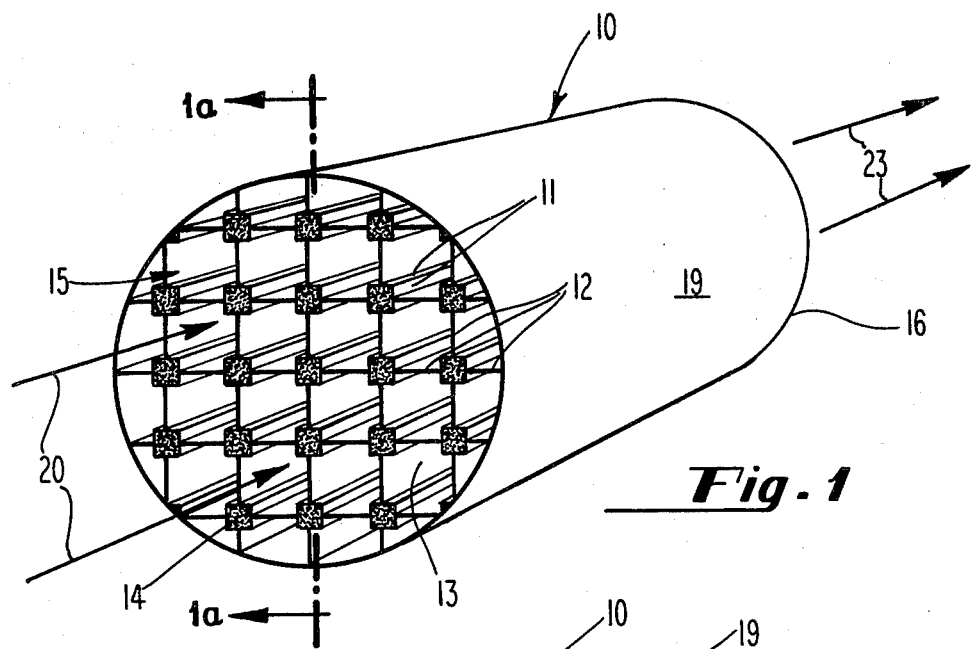
FIG. 1 depicts a first exemplary preferred embodiment solid particulate filter of the present invention revealing its inlet end face.

FIG. 1 is a perspective view of an exemplary preferred embodiment filter body 10 having a multiplicity of thin porous intersecting walls 11 and 12 defining substantially identical inlet and outlet end faces 15 and 16, respectively, on opposing outer sides of the filter 10 and a multiplicity of hollow inlet and outlet passages or cells 13 and 14, respectively, which extend through the filter 10 between the inlet and outlet end faces 15 and 16. Formation of the inlet and outlet cells 13 and 14 is completed by closing in some fashion the ends of each inlet cell 13 near the outlet end face 16 and the end of each outlet cell 14 near the inlet end face 15, the latter being indicated by shading in FIG. 1.

Figure 1A:
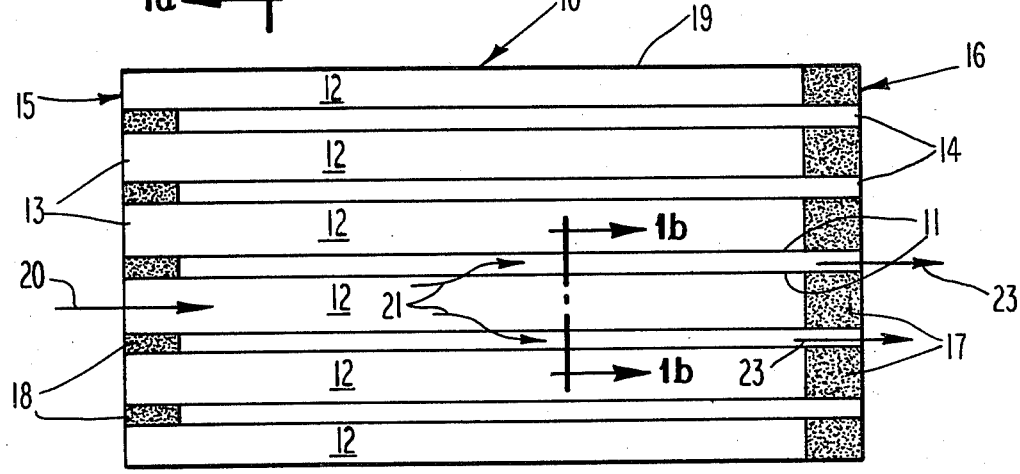
FIG. 1a is a longitudinally cross-sectioned view of the filter of FIG. 1 along the lines 1a—1a depicting the inlet and outlet cells being closed at opposite end faces of the filter.

FIG. 1a is a longitudinally cross-sectioned view of the filter 10 of FIG. 1 along the plane indicated by the line 1a—1a and depicts the substantially identical nature of the inlet and outlet end faces 13 and 14 and plugs 17 and 18 which have been used to close the ends of the inlet and outlet cells 13 and 14 at the outlet and inlet end faces 16 and 15, respectively, the plugs 18 of the outlet cells 14 being represented by shading on the inlet end face 15 of the filter 10 in FIG. 1. A smooth outer surface or skin 19 is provided extending between the end faces 15 and 16 and around the matrix of thin walls 11 and 12 to provide uniform outer dimensioning of the filter and protection to the thin wall matrix.

Figure 1C:
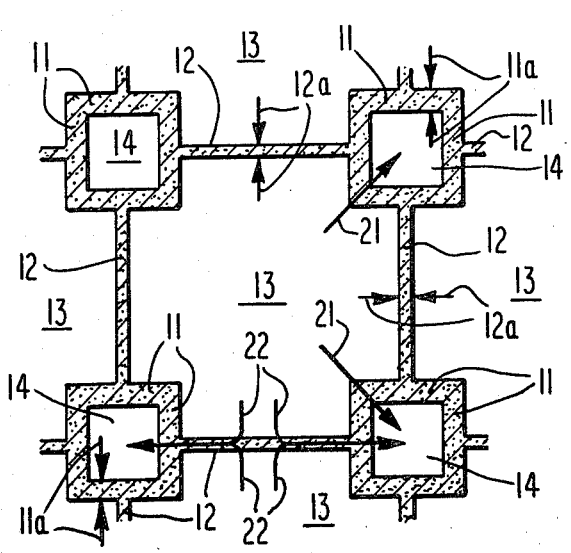
Figure 1B:
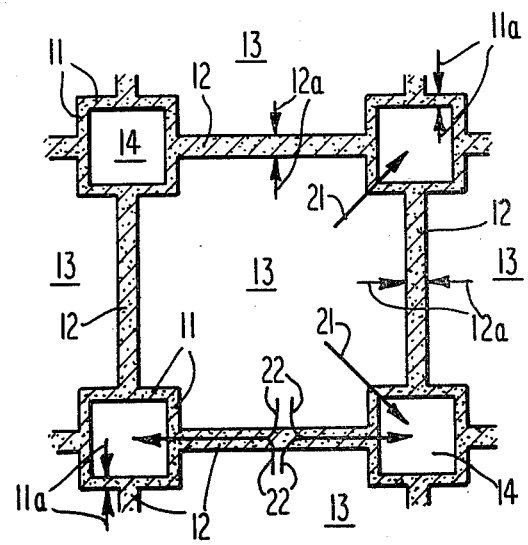
FIG. 1b is an expanded interior view of the filter of FIGS. 1 and 1a along the lines 1b—1b of FIG. 1a, depicting the transverse cross-sections of a subset of the adjoining inlet and outlet cells and the fluid flow between and across their defining thin walls.

FIG. 1b is an expanded view of the interior of the filter 10 along a plane parallel to the end faces 15 and 16 and transverse to the central longitudinal axes of the cells 13 and 14 depicting in more detail the interconnected thin walls 11, which intersect in groups to form each outlet cell 14 and a portion of each inlet cell adjoining the outlet cell 14, and the thin walls 12 intersecting the thin walls 11 and completing the definition of the inlet cells 13. The thin walls 11 are of a first substantially uniform thickness 11a. Each thin wall 11 defines a side of the substantially square cross-section of each outlet cell 14 of FIGS. 1–1c and is shared in common by an outlet cell 14 and a pair of inlet cells 13 adjoining one another and the outlet cell. The thin walls 12 are of a second substantially uniform thickness 12a and each defines in part and is shared in common by a pair of adjoining inlet cells 13. The first substantially uniform thickness 11a of the thin walls 11 in FIG. 1b is less than the second substantially uniform thickness 12a of the walls 12. The thicknesses 11a and 12a are measured away from the intersection of each of the walls 11 and 12 with other interconnecting walls 11 and/or 12 or with the skin 19 of the filter as a filet (not depicted) is typically provided at such intersections during fabrication thereby increasing thin wall thickness near that point.

FIG. 1c is a view similar to that of FIG. 1b of an alternate embodiment filter 10 also having thin walls 11 and 12 forming substantially square inlet and outlet cells 13 and 14 extending between substantially identical inlet and outlet end faces 15 and 16. The walls 11 have a first substantially uniform thickness 11a which is greater than a substantially uniform thickness 12a of the thin walls 12 the purpose of which shall be subsequently explained.

Figure 2:
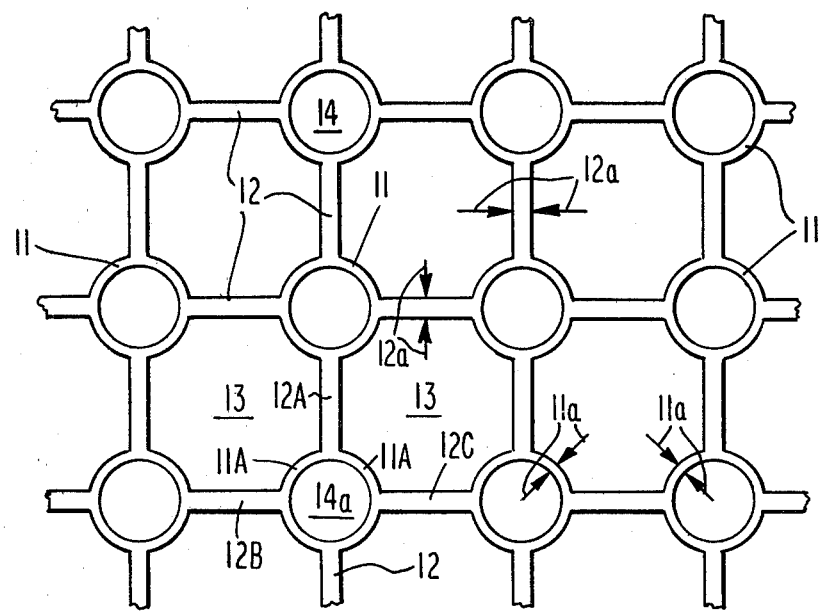
Figure 3:
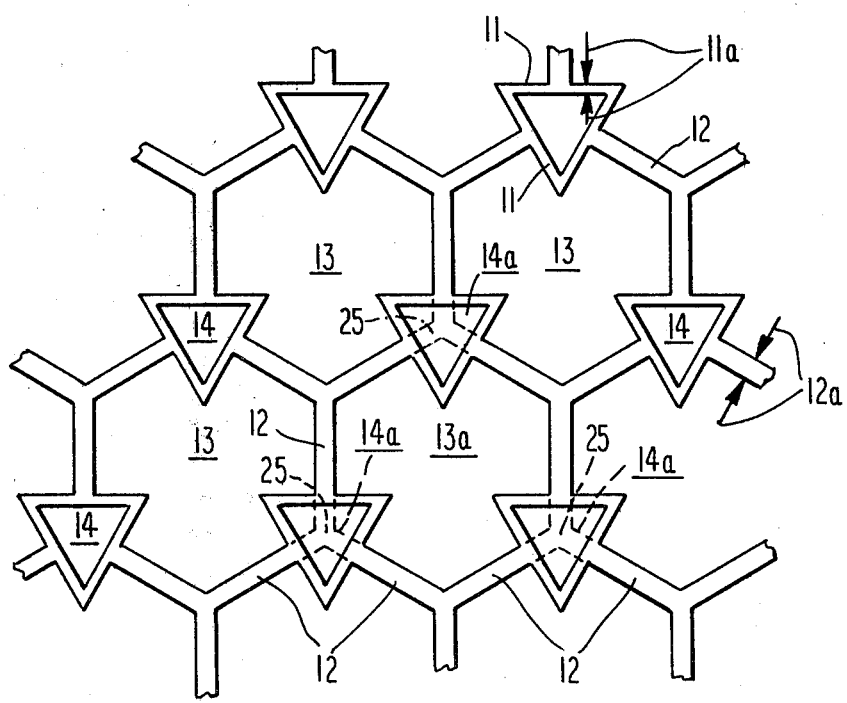

FIGS. 2 through 4 each depict in an expanded view similar to that of FIGS. 1b and 1c, the transverse cross-sections of other exemplary preferred filter embodiments, similar to the filter 10 of FIGS. 1–1c and referred to collectively as the filters 10 of the present invention. FIGS. 2 through 4 illustrate different cellular geometries and/or arrangements of inlet and outlet cells 13 and 14. Interconnected thin walls 11 again defines the outlet cells 14 and thin walls 12, interconnected with the thin walls 11 and at times with one another, complete the definition of the inlet cells 13. The pattern of thin walls 11 and 12 and inlet and outlet cells 13 and 14 depicted in each of FIGS. 2 through 4 is repeated to cover substantially all of the inlet and outlet end faces 15 and 16 on opposing sides of the filters 10, (it generally not being possible to repeat the uniform size and shape of the inlet and outlet cells 13 and 14 at the outer periphery of the end faces 15 and 16). An end of each inlet cell 13 is closed near the outlet end face 16 and an end of each outlet cell 14 is closed near the inlet end face 15 of the filter 10. The thin walls 11 are of a substantially uniform thickness 11a which is less (as depicted) or greater (not depicted) than a substantially uniform thickness 12a of the thin walls 12, as desired, to maximize the flow rates into the walls 11 and 12 or to achieve substantially uniform fluid flow rates into those walls, respectively, as will now be explained.

Typical fluid flow through the filters 10 of FIGS. 1 through 4 is illustrated in FIGS. 1, 1a, 1b and 1c. Contaminated fluid, represented by the lined arrows 20, is brought to the inlet end face 15 by suitable means, such as a fluid conduit across which the filter 10 is positioned with its inlet end face 15 facing the upstream flow, and enters the filter 10 through the inlet cells 13. Looking now at FIGS. 1a, 1b and 1c, a portion of the fluid 20 entering the inlet cells 13 flows into the interconnected open porosity and across the thickness 11a (i.e. width or narrow dimension) of the thin walls 11 shared in common between the adjoining inlet and outlet cells 13 and 14, as is represented by the lined arrows 21. If provided with sufficient interconnected open porosity (i.e. at least about 25% by volume) the fluid in the inlet cells 13 also flows into the thin walls 12 (shared in common by adjoining inlet cells 13) and through their longer transverse cross-sectional dimension into the interconnected thin walls 11 and adjoining or nearby outlet cells 14. This flow is partially depicted by the lined arrows 22. Because of this interconnected open porosity, fluid flow through and across the thin walls 11 and 12 may also occur in the longitudinal direction through the filters 10 (i.e., in and out of the transverse planes of the filters 10 depicted in FIGS. 1b through 4). Filtered fluid is collected in the outlet cells 14 and exits each filter 10 through those cells at the outlet end face 16, as is represented by the lined arrows 23 in FIGS. 1 and 1a. Some fluid within the thin walls 11 and 12 may also pass from each filter 10 at its outlet end face 16 through the interconnected open porosity of the walls 11 and 12 where the ends of the walls 11 and 12 are exposed at the end face 16. It will be appreciated by one skilled in the art that the thin walls 11 and 12 may be provided with interconnected open porosity of a volume and size sufficient to restrain any desired proportion of the solid particulates from passing either completely across or through the thin walls. The restraint of at least a significant portion of all of the solid particulates is desirable in all envisioned applications of the filters although a "significant portion" may constitute less than 50% of the suspended particulates in the fluid passed through the filter in some applications.

Assuming all other factors to be equal, because the distance traveled by the fluid passing through the thin walls 12 from inlet cells 13 to adjoining or nearby outlet cells 14 is, on the average, greater than the distance traveled by the fluid passing across the thin walls 11, hydraulic resistance to flow through the walls 12 is greater than and the flow rate per unit surface area of fluid into the walls 12 is less than that through or into the thin walls 11 if both walls 11 and 12 are of equal thickness. By fabricating the thin walls 11 and 12 of uniform composition but of different uniform thicknesses 11a and 12a, respectively, either of two fluid flow goals may be achieved. Preferably, the thin walls 11 and 12 can be provided with the minimum thicknesses which offer maximum fluid flow rates therethrough while still providing adequate filtration of the solid particulates. Optimum thickness 12a for flow through the longer dimensions of thin walls 12, shared in common between the adjoining inlet cells 13, will be greater than the thickness 11a which optimizes flow across the thin walls 11 between adjoining inlet and outlet cells 13 and 14, as is indicated in FIG. 1b, so as to provide sufficient wall thickness for the fluid traveling through the thin walls 12 to bypass the portions of the interconnected open porosity near the outer surfaces of those walls which face into the open interiors of the inlet cells 13 and which will tend to become clogged with particulates. Alternatively, by forming the thin walls 11 with thicknesses 11a greater than the thicknesses 12a of the thin walls 12, as is depicted in FIG. 1c, relative resistance to flow across the walls 11 can be increased to the point where substantially uniform flow per unit surface area can be achieved through all inlet cell surfaces (i.e., those of each inlet cell 13 formed by the thin walls 11 and 12 defining that cell) and thus provide uniform particulate build up rates on all of the inlet cells thin wall surfaces. It will be appreciated by those in the art that the uniform build up rates will occur on equal surface areas of the thin walls 11 and 12 of each inlet cell 13 at approximately equal distances from the inlet end face 15 but that the particulate build up rates will vary longitudinally along the inlet cells 13 due to cell channel loss effects. The substantially uniform thicknesses 11a and 12a of the thin walls 11 and 12 depicted in FIGS. 2 through 4 have been varied from one another in the manner depicted in FIG. 1b to maximize fluid flow rates through the thin walls 11 and 12. Of course, the relative thicknesses could be reversed (i.e. 11a greater than 12a) to equalize fluid flow rates in the manner of the alternate embodiment depicted in FIG. 1c.

As can be appreciated from the various embodiments depicted in FIGS. 1 through 4, the inlet and outlet cell geometries and relative cell sizes can also be varied to optimize filter performance. Accordingly, the inlet cells 13 have been provided with greater open transverse cross-sectional areas than those provided on the outlet cells 14 to compensate for eventual build up of particulate on the thin wall surfaces of the inlet cells 13 reducing their effective transverse open areas, as is described and claimed in U.S. Pat. No. 4,276,071 which is incorporated by reference herein. Preferably too, the transverse cross-sectional shapes of the inlet cells have no corner angles formed by intersecting walls 11 and/or 12 which are less than about 30° to prevent non-uniform particulate build up in the the smaller angle corners and to enable the cell ends to be completely closed at one or the other of the end faces 15 and 16 as is described and claimed in the aforesaid application Ser. No. 165,646 which is incorporated by reference herein. Numbers of inlet and outlet cells may also be varied, if desired, as is depicted in FIG. 3, to provide greater collective inlet than collective outlet cell thin wall surface areas in accordance with the teachings of the aforesaid copending application Ser. No. 350,995 incorporated by reference herein, so as to optimize the particulate capacity and/or operating time of the filters 10.

Practice of the invention is not limited to the unidirectional flow filters 10 of FIGS. 1 through 4 (i.e. those filters having all inlet and outlet cells extending in the same direction longitudinally through the filter between single inlet and outlet end faces). The invention may also be used with cross-flow type solid particulate filters of honeycomb structure such as the exemplary cross-flow filter 30 depicted in FIG. 5. The filter 30 comprises a multiplicity of thin porous intersecting walls 37, 38 and 39 which define identical inlet end faces 31 and 32 (hidden) on a first pair of opposing sides of the filter 30 and an outlet end face 33 on another side of the filter 30 extending between the inlet end faces 31 and 32. Horizontal thin walls 37 and vertical thin walls 38 intersect one another to define an inlet group of cells 35 open at and extending longitudinally in layers through the filter 30 between the inlet end faces 31 and 32. The thin walls 37 define with intersecting vertical thin walls 39 outlet cells 36 open at and extending from the outlet end face 33 laterally through the filter 30 in layers alternated with the layers of inlet cells 35.

The filter 30 operates in the following manner. Contaminated fluid, represented by the arrows 40, is brought to the inlet end faces 31 and 32 and filtered fluid, represented by the arrows 41, is carried away from the outlet end face 33 of the filter 30 by appropriate conduit means, such as is described and depicted in the aforesaid U.S. Pat. No. 4,276,071. The horizontal thin walls 37 are provided with at least sufficient interconnected open porosity to allow the fluid to pass across them between the adjoining inlet cells 35 and outlet cells 36 sharing each of the thin walls 37 in common. The vertical thin walls 38, between adjoining inlet cells 35 are provided with at least sufficient interconnected open porosity to enable the fluid in the adjoining inlet cells 35 to flow through the thin walls 38 in their longer transverse dimension into the intersecting horizontal thin walls 37 and into adjoining or neighboring outlet cells 36 above and/or beneath them. The open porosity provided in the thin walls 37 and 38 is again sufficient to prevent at least a significant portion of the solid particulate contaminant in the fluid 40 from passing completely across or through either of the thin walls 37 or 38 in any direction from the inlet cells 35 to the outlet cells 36 or the outlet end face 33. The vertical thin walls 39 between adjoining outlet cells 36 are provided primarily for support purposes and provide only a minor filtering function. However, it is preferred that these walls 39 be provided with sufficient open porosity and, preferably, the maximum allowable open porosity which still provides desired wall strength so as to allow free flow of filtered fluid among the outlet cells 36 thereby minimizing the likelihood of higher fluid pressures occurring in some outlet cells 36 which would tend to reduce filtered fluid flow rates into those cells. According to the invention, the thin walls 37 and 38 are of substantially uniform thicknesses 37a and 38a, respectively, which thicknesses differ from each other to either maximize fluid flow rate through the filter in the manner depicted in FIGS. 1b and 2-4 (i.e. thickness 38a greater than thickness 37a) or to equalize fluid flow rates into (and thus particulate deposit rate on) the surfaces of the thin walls 37 and 38 facing the inlet cells 35 in the manner depicted in FIG. 1c (i.e. thickness 37a greater than 38a). If desired, the cross-flow filter 30 can be fabricated alternatively with a single inlet end face 31 or 32 or a pair of identical opposing outlet end faces 33 and 34 or both.

The thin walls 11 and 12 of FIGS. 1 through 4 and 37 through 39 of FIG. 5 can be made of any suitable material that provides the aforesaid requisite interconnected open porosity including powdered metals, glasses, ceramics (generally crystalline), resins or organic polymers, papers or textile fabrics (with or without fillers), etc. and combinations thereof, including, for example, glass-ceramic mixtures and cermets. It is preferred to fabricate the thin walls 11, 12, and 37 through 39 from plastically formable and sinterable, finely divided particles and/or short length fibers of substances that yield a porous sintered material after being fired to effect the sintering thereof, especially powdered metals, glasses, ceramics, cermets, glass-ceramics mixtures and other ceramic based materials. In addition to volatizable plasticizers and/or binders which may be used to prepare workable batch mixtures, any suitable or conventional fugitive or combustible (burn-out) additive can be dispersed within the formable and sinterable mixtures so as to provide appropriate adequate interconnected open porosity in the sintered interconnecting thin walls. The requisite open porosity can be designed into the thin walls 11, 12, and 37 through 39 by raw material selection as is described in U.S. Pat. No. 3,950,175, incorporated by reference herein. Although the matrices of thin walls may be fabricated by any suitable technique for the materials selected, the matrices of thin walls 11 and 12 of unidirectional flow filters, such as are depicted in FIGS. 1 through 4, are preferably formed monolithically, with or without a continuous skin 19 extending between the inlet and outlet end faces 15 and 16, by extrusion from a sinterable mixture in a manner as is disclosed in U.S. Pat. Nos. 3,790,654, 3,919,384, 4,008,033 and in a pending application Ser. No. 260,343 filed May 4, 1981, assigned to the assignee hereof, all of which are incorporated by reference herein. Because of the varying orientation of the inlet and outlet cells 35 and 36, cross-flow filters such as the filter 30 of FIG. 5 are preferably formed from the same materials by layering techniques as are disclosed, for example, in U.S. Pat. Nos. 3,112,184 and 3,444,925 incorporated by reference herein. Different numbers of layers of material may be used, for example, in the layering process to achieve variation in the thickness 37a and 38a of the thin walls 37 and 38, respectively. If desired, the layering method may also be employed to fabricate unidirectional flow filters by orienting the layers of inlet and outlet cells in the same direction through the filter between a pair of opposing inlet and outlet end faces.

The ends of the cells may be closed at the inlet and outlet end faces 15, 16, 31, 32, and 33 with any material and/or in any manner compatible with the material of the thin walls 11 and 12 or 37, 38 and 39 under the envisioned service conditions of the filters 10 or 30. This includes non-deleterious reaction to the thin wall material and the contaminated fluid, either singularly or in common, good adhesion to the thin walls, suitable durability at desired fluid flow rates, sufficiently similar coefficients of thermal expansion (if the filter is to be used at elevated temperatures), etc. Preferably, the selected cell ends are closed by charging them with a flowable or plastically formable material. Preferably too, the plugging material is hardenable by setting, curing, drying, sintering, etc. in order to form a substantially rigid plug mechanically and/or chemically adhered to the thin walls and completely filling the cell end. Methods and apparatus for charging flowable and plastically formable materials including sinterable cement mixtures into selected cell ends of a rigid honeycomb structure are described in the aforesaid application Ser. No. 165,646 and in the following pending applications which are assigned to the assignee hereof and incorporated by reference herein: Ser. No. 283,732, Ser. No. 283,733, Ser. No. 283,734, and Ser. No. 283,735, all filed July 15, 1981, and Ser. No. 295,610, and Ser. No. 295,611, both filed Aug. 24, 1981. Where all open cell ends on an outer surface of the filter are to be filled, as is the case with respect to the ends of the outlet cells 36 which would normally be formed open at the end face 34 of the filter 30 of FIG. 5, the entire end face may be dipped or pressed into an appropriate plugging material to close all cell ends open at that end face.

Where the preferred sinterable materials are used to form the matrices of thin walls, compatible sinterable cement mixtures are preferably used to form plug-type closure means 17 and 18 in the selected cell ends. Generally, the previously referred to plugging methods and/or apparatus may be with either green (i.e. dried but not sintered) or sintered honeycomb structures, as well as with other rigid, non-sinterable honeycomb structures. While it is possible to form a usable filter by plugging a green thin wall matrix with a sinterable plugging material and firing the matrix to a temperature at which it is substantially sintered and the plugging material is not substantially sintered but is somewhat rigified, such filters are generally not preferred nor as durable as those in which the plugging material is also substantially sintered. Alternatively, a cement having a lower sintering temperature may be charged into a previously sintered matrix of thin walls having a higher sintering temperature, and the filter again fired to effect the sintering of the plugging material. Dimensional change (typically shrinkage but possibly expansion) of the sinterable matrix material upon sintering and/or the sinterable plugging material(s) upon drying or drying and sintering may be compensated for by using a plugging material which foams when fired during its sintering, such as the foam-type ceramic cements described in U.S. Pat. Nos. 3,189,512 and 3,634,111 and in commonly assigned application Ser. No. 165,647, filed July 3, 1980, now U.S. Pat. No. 4,297,140, which are incorporated by reference herein, or a plugging material which undergoes an appropriate net relative linear expansion with respect to the matrix material such as is described and claimed in the another commonly assigned pending application Ser. No. 295,612, also filed Aug. 24, 1981 and incorporated by reference herein.

Filters according to the present invention may be designed to remove any of a wide variety of solid particulates from any of a wide variety of fluids. As the filters are preferably fabricated from ceramic materials capable of withstanding elevated temperatures, significant envisioned uses of such preferred filters are as exhaust gas and molten metal filters and as heat exchangers, which uses are described in more detail in the aforesaid application Ser. No. 165,646. In each of these uses, the filter would typically be subjected to thermal shock, resting at some ambient temperature and then suddenly being subjected to a fluid at a much higher temperature.

U.S. Pat. Nos. 4,127,691 and 4,135,018 incorporated by reference herein, describe honeycomb structures formed from brittle materials (as would be the matrices of thin porous walls formed from the preferred sinterable materials) comprising a multiplicity of cells of uniform size and shape which provide flexing or movable expansion joint means built into each individual cell structure which can tolerate large strains without breaking, especially under thermal stresses generated by thermal expansion and contraction of the thin walls. Another aspect of my invention is the incorporation of flexing or moveable joints into a honeycomb matrix, such as is used in the aforesaid honeycomb structures, having cells of different transverse cross-sectional size and shape. This aspect of the invention is depicted in an exemplary fashion in the unidirectional flow filters 10 depicted in FIGS. 1 through 4. According to this aspect of the invention, the size, shape and arrangement of the inlet and outlet cells 13 and 14 are selected so that no group of the thin walls 11 and 12 forms a continuous or substantially continuous plane extending entirely across or across any substantial portion of the end faces 15 and 16 of the filter 10. In the unidirectional flow filters of the type depicted in FIGS. 1 through 4, the most significant thermal stresses are believed to occur near the outer periphery of the end faces 15 and 16 as fluid flow into the peripherally located inlet cells 13 is often restricted by the manner of mounting the filter 10 or is reduced due to dynamic interaction with the conduit surfaces. Thus, the occurence of interconnected thin walls 11 and/or 12 extending in an essentially planar fashion from the edges of the end faces 15 and 16 are to be avoided. Rather, flexing or moveable joints of the type referred to in the aforesaid U.S. Pat. Nos. 4,127,691 and 4,135,018 are formed at the ends of many or all of the thin walls 12, shared in common between adjoining inlet cells 13, where each intersects a thin wall 11 forming a portion of an outlet cell 14.

One method to form flexing joints is to design the inlet cells 13 of a uniform size and shape in order that they might themselves, in the absence of the outlet cells 14, form a uniform, continuous matrix merely by the extension of their thin walls 12. This has been depicted in phantom with respect to the outlet cells 14a of FIG. 3 to form a hexagonal "inlet" cell 13a. The outlet cells 14 are then located where the thin walls 12 forming the adjoining inlet cells would normally intersect (i.e., the representative intersections 25 indicated in phantom in FIG. 3).

Preferably, the geometries and locations of the outlet cells 14 are such as to enable the ends of many or all of the thin walls 12, each shared in common between adjoining inlet cells 13, to each intersect a thin wall 11 desirably at an angle greater than about 60° and preferably in a substantially perpendicular orientation to the greater transverse cross-sectional dimension of the thin walls 11 and near the center of each thin wall 11. This staggering of thin wall intersections allows the thin walls 11 to deflect when thin walls 12 expand or contract forming a flexing or movable joint. Polylateral shapes formed by the same numbers of thin walls 11 as the number of inlet cell walls 12 intersecting them, such as the four-walled square outlet cells 14 located at the intersections of the square inlet cells 13 in FIG. 1 and the triangular outlet cells 14 located at the intersections of the adjoining hexagonal inlet cells 13 of FIG. 3, may conveniently be used for the outlet cells 14. Alternatively, outlet cells 14 having circular or curvilinear transverse cross-sectional geometries, as are depicted in FIGS. 2 and 4, may also be used with virtually any inlet cell shape to obtained the preferred, substantially perpendicular intersection with the outlet cell walls 11. The circular thin walls have no apparent midpoint. However, using an inlet cell shape which provides uniform angular spacing of the thin walls 12 about hypothetical intersections 25 (i.e. equilateral shapes such as the squares and hexagons depicted) will provide the equivalent of the preferred centrally positioned, perpendicularly-oriented intersections of the thin walls 12 with the thin walls 11. Thus, for example, the intersection of a thin wall 12A with a circular outlet cell 14a in FIG. 2 may be viewed as an intersection with the midpoint of a wall 11A extending between two other intersecting thin walls 12B and 12C equally spaced to either side of the first intersecting thin wall 12A. Of course, other inlet and outlet cell orientations, sizes and shapes may be used in the practice of this invention.

Lastly, the outlet cells 14 need not be located at all inlet cell junctions 25. Sufficient numbers of outlet cells 14 may be provided in regularly located positions, such as is depicted in FIG. 3, so as to preclude planes of thin walls 11 and/or 12 from being formed entirely across or across any substantial portion of the area of the end faces 15 and 16. It further will be appreciated that this aspect of my invention may be practiced with thin walls 11 and 12 of either uniform or nonuniform thicknesses and/or composition.

One desirable envisioned use of the above-described filters is in the entrapment of solid carbonaceous particulates present in diesel engine exhaust gases. Unidirectional flow filters, such as those depicted in FIGS. 1 through 4, may be mounted for use as diesel engine exhaust filters in the manner described in the aforesaid application Ser. No. 165,646. Cross-flow filters such as the filter 30 of FIG. 5, may be mounted for use in the manner described in U.S. Pat. No. 4,276,071. Filters for this use are preferably formed from cordierite ceramic materials of the type disclosed in U.S. Pat. Nos. 3,885,977 and 4,001,028 both incorporated by reference, due to their ability to withstand and be durable under the thermal, chemical and physical conditions to which they are subjected in diesel exhaust gas systems. The aforesaid application Ser. No. 165,646 sets forth in its TABLE I various batch mixture compositions which may be extruded in a manner described in the previously referred to U.S. Pat. Nos. 3,790,654, 3,919,384, and 4,008,033 and the aforesaid pending application Ser. No. 260,343 and sintered to yield thin walls of desired thicknesses (greater than about 0.002 inches [about 0.05 mm.]) and various open porosities and mean pore diameters. Preferably, the extruded thin wall matrices are fired to effect their sintering and reaction to a primarily cordierite crystal phase. The sintered matrices are preferably plugged with the manganese-magnesium foam-type ceramic cement also described in the aforesaid application Ser. No. 165,646 using the previously referred to methods and apparatus for charging flowable plugging materials into selected cells of honeycomb structures and thereafter refired to cause the sintering and reaction of the cement into rigid plugs having a primarily cordierite crystal phase. Alternatively, green (i.e. dried but not sintered) thin wall matrices may be selectively plugged with formable batches of ceramic materials having appropriate relative linear expansions with respect to the thin wall material, as is described and claimed in the aforesaid application Ser. No. 295,612, and subsequently fired to effect the sintering and reaction of the thin walls and plugging materials into primarily cordierite crystal phases. To achieve fluid flow through the longer dimensions of the thin walls (i.e. through the walls 12 between adjoining inlet cells 13 into and through the walls 11 of adjoining or nearby outlet cells 14), thin wall volumetric open porosity of at least 25% and preferably at least 35% is provided.

For diesel engine exhaust particulate filtration, which entails the entrapment of particles ranging in size from about 5 microns down to and below about 0.05 microns, thin wall open porosities greater than about 40% by volume are preferred and may be provided by pores having mean diameters in the range between about 1 and 60 microns and, preferably, between about 10 and 50 microns. It is envisioned that mean pore diameters less than one micron may be advantageous in other applications of these filters. The thin walls are less than about 1.5 mm. (about 0.06 in.) thick and preferably between about 0.25 and 0.76 mm. (0.010 and 0.030 in.) thick to minimize filter volume and thermal shock problems while providing sufficient mechanical strength. Maximum open pore volume will vary with wall thickness and mean pore size and a limit of about 70% is suggested with the indicated preferred values. Open pore volume and mean pore size are determined by conventional mercury intrusion porosimetry.

While various embodiments of the invention and suggested modifications thereto have been described, it should be understood that other modifications could be made in the structure, composition and arrangement of the components of the described embodiments without departing from the scope of the invention which is more fully defined in the following claims.

What is claimed is:

1. A filter for removing solid particulates from fluids passed therethrough comprising:

a multiplicity of interconnected thin porous walls forming a matrix defining at least one inlet end face and at least one outlet end face of the filter and a multiplicity of cells each extending through the filter from at least one of the inlet or outlet end faces, an inlet group of the cells each open only at said at least one inlet end face, an outlet group of the cells each open only at said at least one outlet end face of the filter, a first subset of the thin walls having a first uniform thickness, each first subset thin wall being shared in common by one of the outlet cells and one or more of the inlet cells adjoining the outlet cell and having an interconnected open porosity of a size and volume sufficient to allow the fluid to flow completely across the first uniform thickness of the first subset of thin walls while preventing at least a significant portion of the solid particulates in the fluid from passing completely across the first subset of thin walls, a second subset of the thin walls having a second uniform thickness, each second subset thin wall interconnecting with at least one thin wall of the first subset and forming a common wall between a pair of adjoining inlet cells and having an interconnected open porosity of a size and volume sufficient to allow fluid to flow completely through the longer dimensions of each of the second subset thin walls to the interconnected thin wall of the first subset and to prevent at least a significant portion of the solid particulates from passing either completely across or through the second subset of thin walls in any direction, and said first uniform thickness differing from said second uniform thickness.

2. The filter of claim 1 wherein:

a matrix of thin walls defines a single inlet end face and a single outlet end face on opposite sides of the filter and said multiplicity of cells extends substantially longitudinally through the filter between the two end faces, the thin walls of the first subset each defines a common thin wall between each outlet cell and one or more adjoining inlet cells, substantially all cells of the inlet group each adjoins at least one other inlet cell, and the thin walls of the second subset each defines a common thin wall between each pair of adjoining inlet cells.

3. The filter of claim 2 wherein:
the first and second subsets of thin walls comprise substantially all thin walls of the matrix,
substantially each outlet cell of the filter is defined by a group of intersecting thin walls of the first subset, and
substantially each inlet cell of the filter is defined by intersecting walls of the first and second subsets of the thin walls.

4. The filter of claim 3 wherein the thin walls are positioned in the matrix such that no group of the thin walls intersects one another to form a substantially continuous plane across any substantial portion of said inlet and outlet end face.

5. The filter of claim 1 or 3 wherein the greater thickness of the first and second uniform thicknesses is at least 0.003 inches thicker than the remaining uniform thickness.

6. The filter of claim 5 wherein the greater thickness of said first and second uniform thicknesses is at least 20% thicker than the remaining uniform thickness.

7. The filter of claim 5 wherein said second uniform thickness is greater than said first uniform thickness so that the rate of fluid flow into the first subset thin walls is greater than the rate of fluid flow into an equal surface area of the second subset thin walls forming the same inlet cell.

8. The filter of claim 5 wherein said first uniform thickness is greater than said second uniform thickness so that rates of fluid flow into equal surface areas of said first and second subset thin walls forming a given inlet cell are substantially equal.

9. The filter of claim 5 wherein the open porosity of each of the thin walls is at least 25% by volume.

10. The filter of claim 5 wherein the open porosity of each of the thin walls is at least about 35% by volume.

11. The filter of claim 10 wherein the open porosity is formed by pores having mean diameters of about 1 micron or more.

12. The filter of claim 11 wherein the said first and second uniform thicknesses are between about 0.25 and 0.76 mm.

13. The filter of claim 5 wherein the thin walls are formed from a ceramic-based material.

14. The filter of claim 5 wherein the inlet cells have individual cross-sectional areas substantially greater than the respective individual cross-sectional areas of the outlet cells.

15. The filter of claim 14 wherein the collective thin wall surface area of the inlet cells is at least 25% greater than the collective thin wall surface area of the outlet cells.

16. The filter of claim 5 wherein the open porosities of the thin walls are further of a volume and size sufficient to prevent substantially all of the solid particulates from passing either completely across or through the thin wall in any direction.

17. A filter for removing solid particulates from fluids passed therethrough comprising:
a matrix of interconnected thin brittle walls defining one inlet end face and one outlet end face on opposite sides of the filter and a multiplicity of cells extending through the filter between the inlet and outlet end faces, an inlet group of the cells being open at the inlet end face and said filter including means closing the inlet cells at the outlet end face and an outlet group of the cells being open at the outlet end face and said filter including means closing the outlet cells at the inlet end face of the filter,
the thin walls having interconnected open porosity of a size and volume sufficient to allow the fluid to flow completely across a thickness of the thin walls and to restrain at least a significant portion of the solid particulates from passing either completely across or through the thin walls in any direction,
each wall of a first subset of the thin walls being shared in common between an outlet cell and one or more inlet cells adjoining the outlet cell,
each wall of a second subset of the thin walls being shared in common between pairs of adjoining inlet cells, and
each wall of the first subset of thin walls being intersected by an edge of one of the thin walls of said second subset whereby a flexing joint is formed therebetween.

18. The filter of claim 17 wherein:
each of the first subset and second subset thin walls is substantially planar and extends transversely between a pair of opposing edges,
each outlet cell is at least substantially defined by groups of first subset thin walls intersecting one another at the transverse edges, and
substantially each of said first subset thin walls is intersected by a transverse edge of one of said second subset thin walls in a direction substantially perpendicular to the plane of said first subset of thin walls and at a point substantially midway between said transverse edges of the first subset of thin walls.

19. The filter of claim 17 wherein:
each of the second subset thin walls is substantially planar and extends transversely between a pair of opposing edges,
each outlet cell has a continuous closed curve transverse cross-sectional geometry formed by one of said first subset thin walls, and
substantially all thin walls of the first subset are each intersected by a transverse edge of each of three or more second subset thin walls, each of said second subset thin walls intersecting one of the first subset thin walls in a direction substantially perpendicular to the first subset thin walls and at a point substantially midway between intersections of said first subset thin walls with two other of the second subset thin walls.

20. In a method of fabricating a filter of honeycomb structure for removing solid particulates from fluids passed through the filter comprising the steps of (a) providing a matrix of thin brittle interconnected porous walls defining an inlet end face and outlet end face on opposite sides of the filter and a multiplicity of cells extending between the inlet and outlet faces and through the filter and further having interconnected open porosity of a size and volume sufficient to enable fluid to flow completely across the thickness of the thin walls and to restrict at least a significant portion of the solid particulates from flowing either completely across or through the thin walls in any direction, (b) forming an inlet group of cells open at the inlet end face and closed at the outlet end face and an outlet group of cells open at the outlet end face and closed near the inlet end face, a first subset of the thin walls being shared in common by adjoining inlet and outlet cells and a second subset of the thin walls being shared in common by pairs of adjoining inlet cells, the improvement comprising the step of intersecting in a substantially perpendicular fashion each of the thin walls of the first subset with a thin wall of the second subset whereby a flexing joint is formed therebetween.

21. In a method of fabricating a filter of honeycomb structure of filtering solid particulates from fluids passed through the filter comprising the steps of (a) providing a matrix of thin interconnected porous walls defining inlet and outlet end faces of the filter and a multiplicity of cells each extending from at least one of the inlet and outlet end faces through the filter and having interconnected open porosity of a size and volume sufficient to enable fluid to flow completely across and through the thin walls in any direction and to restrict at least a significant portion of the solid particulates from flowing either complete across or through the thin walls in any direction, and (b) forming an outlet group of cells open only at one or more of the outlet end faces and an inlet group of cells open only at one or more of the inlet end faces, and adjoining one another and the outlet cells, pairs of adjoining inlet cells sharing a first subset of the thin walls in common and adjoining inlet and outlet cells sharing a second subset of the thin walls in common, the improvement comprising forming the first subset of thin walls with a first substantially uniform thickness and the second subset of thin walls with a second substantially uniform thickness different from the first substantially uniform thickness.

22. The method of claim 21 wherein the forming of the thin walls provides the second substantially uniform thickness greater then the first substantially uniform thickness.

23. The method of claim 21 wherein the forming of the thin walls provides the first substantially uniform thickness greater than the second substantially uniform thickness.

* * * * *